(12) United States Patent
Spichtinger et al.

(10) Patent No.: US 8,690,500 B2
(45) Date of Patent: Apr. 8, 2014

(54) TOOL INTERFACE

(75) Inventors: Xaver Franz Spichtinger, Oberviechtach (DE); Ullrich Kirchhof, Shotten (DE); Christian Anton Spachtholz, Lampenricht (DE); Heinrich Georg Manner, Guteneck (DE); Armin Josef Zimmermann, Oberviechtach (DE); Volker Fritsche, Wehrheim (DE)

(73) Assignee: Kennametal Inc., Latrobe, PA (US)

( * ) Notice: Subject to any disclaimer, the term of this patent is extended or adjusted under 35 U.S.C. 154(b) by 605 days.

(21) Appl. No.: 12/893,376

(22) Filed: Sep. 29, 2010

(65) Prior Publication Data
US 2011/0081212 A1    Apr. 7, 2011

(30) Foreign Application Priority Data
Oct. 2, 2009  (DE) .......................... 10 2009 048 010

(51) Int. Cl.
B23B 31/11      (2006.01)

(52) U.S. Cl.
USPC ........................... 409/234; 279/8; 408/239 R

(58) Field of Classification Search
USPC ....... 279/8; 408/238, 239 R, 239 A; 409/234; 407/102
See application file for complete search history.

(56) References Cited

U.S. PATENT DOCUMENTS

| | | | | |
|---|---|---|---|---|
| 2,153,236 A * | 4/1939 | Christman | ....................... | 407/33 |
| 3,307,243 A * | 3/1967 | Andreasson | ...................... | 407/11 |
| 3,320,833 A * | 5/1967 | Andreasson | ...................... | 408/57 |
| 4,604,010 A * | 8/1986 | Reeves | .......................... | 409/233 |
| 4,929,131 A * | 5/1990 | Allemann | ...................... | 409/234 |
| 7,478,978 B2 * | 1/2009 | Jonsson et al. | ................. | 408/233 |
| 2003/0143044 A1 * | 7/2003 | Rothenstein | ................... | 408/233 |
| 2003/0210963 A1 * | 11/2003 | Kakai et al. | .................... | 408/231 |
| 2004/0213642 A1 * | 10/2004 | Pantzar | ......................... | 409/234 |
| 2006/0062642 A1 * | 3/2006 | Jonsson et al. | ................. | 408/233 |
| 2010/0061820 A1 * | 3/2010 | Haimer | .......................... | 408/143 |

FOREIGN PATENT DOCUMENTS

WO    2008110370 A1    9/2008

* cited by examiner

*Primary Examiner* — Daniel Howell
*Assistant Examiner* — Brendan Ayer
(74) *Attorney, Agent, or Firm* — Larry R. Meenan, Esq.

(57) ABSTRACT

A tool interface that is easy to produce but also precise, for coupling a tool head to a tool shank in a centered manner in respect of a shank axis, comprises a first interface part that is connected to the tool shank or to the tool head, and a second interface part that is connected to the respectively other tool part, namely, to the tool head or to the tool shank. The two interface parts have interface surfaces that substantially complement each other and are intended to bear flatly on each other. The interface surface of the first interface part comprises an inner cone surface and an outer cone surface, which surrounds the latter on the outside and coaxially. The interface surface of the second interface part comprises an outer cone surface, which corresponds with the inner cone surface of the first interface part, and an inner cone surface, which corresponds with the outer cone surface of the first interface part. In the case of a first invention variant, an annular web formed between the inner cone surface and the outer cone surface of the first interface part is slotted by at least one recess. In the case of a second invention variant, the second interface part has a central bore surrounded coaxially by its outer cone surface, an annular web formed between the outer cone surface and this bore being in this case slotted by at least one recess.

18 Claims, 6 Drawing Sheets

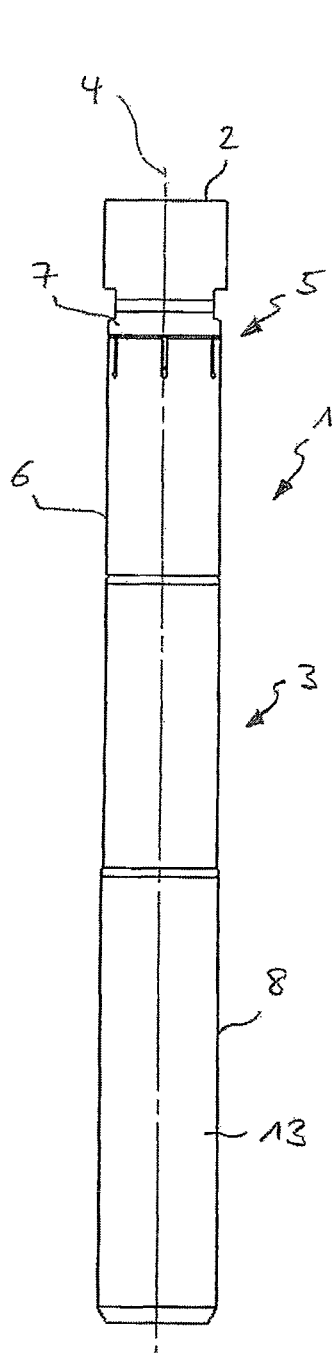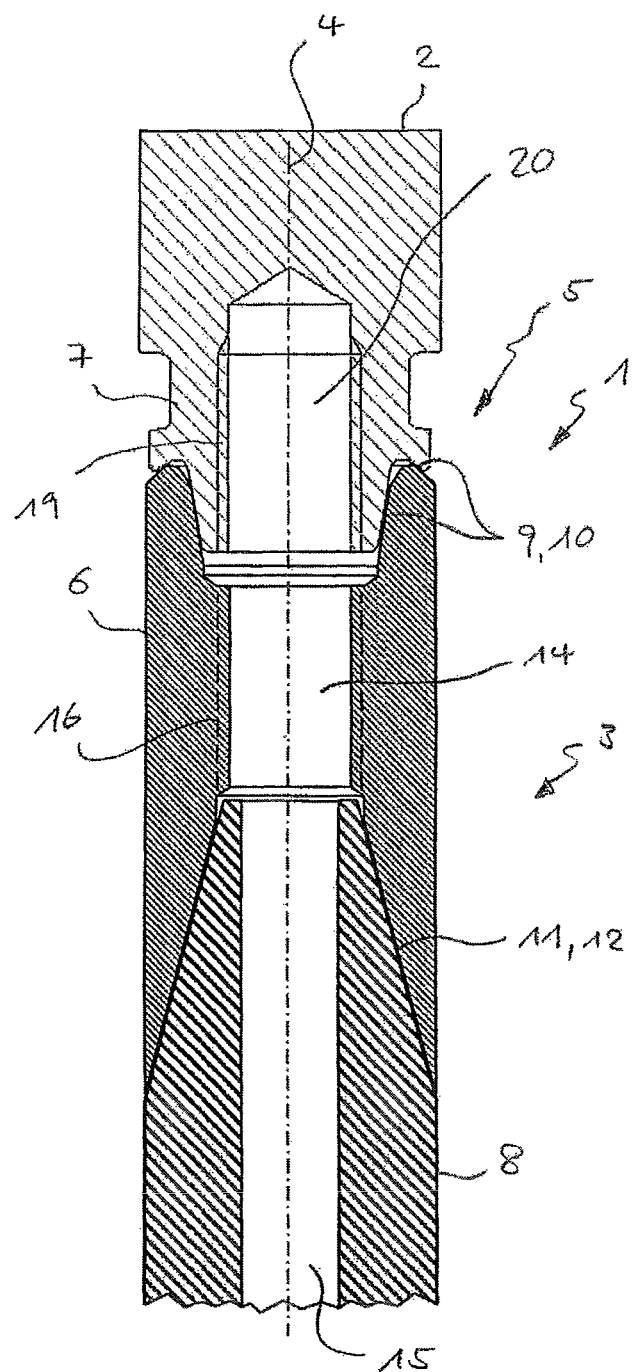
FIG. 1
FIG. 2

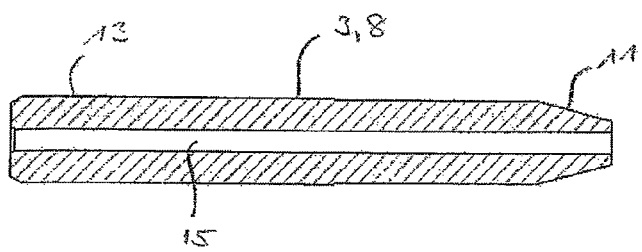
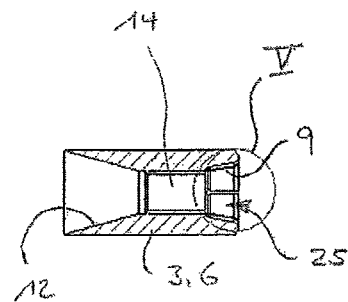
FIG. 3
FIG. 4
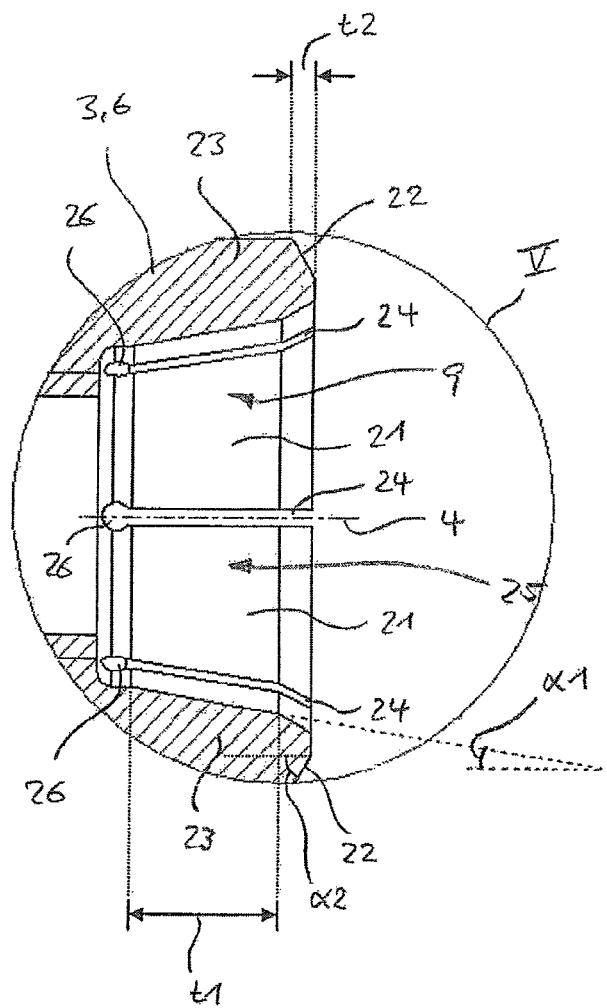
FIG. 5

TOOL INTERFACE

BACKGROUND OF THE INVENTION

The invention relates to a tool interface, i.e. a tool interface for coupling a tool head to a tool shank in a centered manner in respect of a shank axis, according to the preamble of claim 1. Such a tool interface is known from WO 2008/110370 A1.

The tool head is, in particular, a stock-removing tool head, e.g. a drilling, turning, milling, reaming or grinding head. The invention further relates to a tool head or tool shank provided with an associated part of such an interface, and to a tool comprising the tool head, the tool shank and the interface.

There is increasing use of multipart tools, in which the tool head and the tool shank are produced independently of each other and are coupled to each other via an interface of the above-mentioned type. Advantages of multipart tool production as compared with single-piece production of a tool head and tool shank are, in particular, that the tool head, when worn out, can be exchanged independently of the tool shank, and that one and the same shank can be used as a common holder for a plurality of tool heads existing as a set. In both cases, costs of material and production are saved in the use of the tool or of a corresponding tool set. A further advantage of multipart tool production is that the tool head and the tool shank can be produced from differing materials, each particularly well suited to the respective requirements. In particular, frequently the tool head is produced—for cost reasons, inter alia—from a hard, but comparatively brittle sintered metal, while a material that is stable under torsional load, in particular steel or hard metal, is normally selected for the tool shank. The shank in this case, in turn, can be composed of a plurality of parts, which can be of differing materials. The tool head also, in turn, can be a multipart tool head, in particular composed of a carrier having cutting inserts fastened thereon.

A tool interface of the above-mentioned type always consists of two interface parts, of which one is assigned to the tool shank and the other is assigned to the tool head. The shank and head of a tool in this case are usually screw-connected, for which purpose the interface parts have corresponding screw-connection means. In addition, the two interface parts are normally provided with mutually complementary interface surfaces, which are intended to bear flatly on each other and enable the tool to be seated in a precise manner on the shank, in particular centered exactly relative to a shank axis. This is intended, in particular, to prevent concentricity errors in the case of tools operated in rotation.

Often, these interface surfaces are realized as so-called plane-cone surfaces. Such surfaces comprise a conical partial surface and, adjoining the latter, a plane partial surface that is perpendicular to the shank axis, the corresponding interface surfaces bearing on each other in both surface regions when in the mounted state. Such a plane-conical seating requires extremely precise production of the associated interface surfaces, particularly since even small machining errors result an inadequate bearing contact of the interface surfaces, either in the conical or in the plane region. In the case of sintered tool heads, in particular, the required precision of the interface surface is not achievable, or can be achieved only with a large resource input. In particular, the interface surfaces of the head-side interface part in the case of such tool heads normally require resource-consuming reworking, by turning, milling and/or grinding.

OBJECT OF THE INVENTION

The invention is based on the object of specifying an easily producible but precise, in particular precisely centered, connection of a tool head to an associated tool shank.

ACHIEVEMENT OF THE OBJECT

This object is achieved independently, according to two alternative invention variants, by a tool interface having the features of patent claims 1 or 2. In the case of both invention variants, the tool interface comprises two interface parts having mutually substantially complementary interfaces intended to bear flatly on each other. The interface surface of a first of the interface parts in this case has an inner cone surface, which is surrounded on the outside and coaxially by an outer cone surface. Owing to the complementary design, the interface surface of the second interface part has, on the inside, an outer cone surface that corresponds to the inner cone surface of the first interface part. The outer cone surface of the second interface part is surrounded coaxially by an inner cone surface, which corresponds to the outer cone surface of the first interface part. One of the two interface parts is connected, respectively, to each of the two tool parts, namely, the tool shank or the tool head. Thus, either the first interface part is connected to the shank, while the second interface part is connected to the head, or vice versa.

Referred to as an "inner cone surface" in this case is a conical surface (more precisely: frustum-shaped curved surface) that faces towards the shank axis. Correspondingly, referred to as an "outer cone surface" is a cone surface (again, more precisely: frustum-shaped curved surface) that faces away from the shank axis. To simplify terminology, the axis of the tool head is also referred to as a "shank axis", particularly since, owing to the centering, the axes of the tool head and tool shank coincide when these two components are in the mounted state. The term "shank axis" is used for the axis of the tool head, in particular, even when the tool head is separate from the tool shank and its actual axis might therefore differ from the actual axis of the tool shank.

An annular web is realized between the outer cone surface and the inner cone surface. In the case of the invention variant according to claim 1, this annular web is interrupted by at least one recess. In other words, the annular web is slotted at least once.

In the case of the second invention variant, the second interface part is additionally provided with a central bore, which is surrounded coaxially by the outer cone surface of the second interface part. Consequently, an annular web, which again is interrupted by at least one recess, i.e. slotted, is formed here on the second interface part, between the bore and the surrounding outer cone surface.

In the case of both variants of the tool interface according to the invention, the centering of the tool head in respect of the tool shank is effected primarily by means of the inner cone surfaces, i.e. the inner cone surface of the first interface part and the corresponding outer cone surface of the second interface part. Owing to the slotted design of the respective annular web, the elastic flexibility of the adjoining inner or outer cone surface is then increased substantially. This makes it possible, in particular, for the respectively other interface part and the associated interface surfaces to be produced with comparatively low precision, particularly since, owing to its flexibility, the slotted interface part adapts to given production tolerances of the other interface part. As is known, however, the recess or each recess as such has the effect, disadvantageous per se, that it also weakens the radial guiding effect of the slotted interface part. If one or more of the described recesses were to be provided in the case of a tool interface having simply cone interface surfaces, a tool head chucked in such an interface would tend under load, as is known, to "come away" laterally, i.e. to tilt in relation to the shank axis. This, in turn, would disturb the concentricity of the tool. Furthermore, as is known, in the case of intensive radial loading of the first interface part—if the latter is slotted—the annular web could come away to some extent.

This weakening of the slotted interface part, caused by the recess or each recess, is then countered by the outer cone surfaces, i.e. the outer cone surface of the first interface part and the corresponding inner cone surface of the second interface part. This applies particularly in the case of the first invention variant, in which the annular web formed between the two cone surfaces of the first interface part is slotted. This is because, when the two interface parts have been joined, the radial web of the first interface part is acted upon in the radially inward direction by force deflection at these outer cone surfaces. The annular web is therefore locked in position radially between the inner and the outer cone surface of the second interface part, such that the second interface part stabilizes the first interface part weakened by the recess or each recess.

For the purpose of optimizing the stabilizing effect, in the case of both invention variants one of the two interface parts, respectively, is preferably not slotted. In particular, expediently, the inner cone surface of the second interface part is not slotted.

In summary, the tool interface according to the invention makes it possible for the interface surface of at least one of the interface parts to be produced with comparatively low precision, without impairment of the centering effected by the interface or of the stability of the mounting effected by the interface. The tool interface and the tool parts connected thereto can therefore be produced in a comparatively simple and cost-effective manner, without this resulting in a reduction in the quality of the tool.

The slotted interface part is preferably connected to the tool shank, i.e. arranged on the shank side. The respectively other interface part, on the other hand, is preferably connected to the tool head, i.e. arranged on the head side. This is advantageous, in particular, when the interface part on the head side is not slotted, i.e. has cone surfaces not interrupted on their circumference. This is because it enables the tool head to be produced as a single piece, and the interface part to be produced from a comparatively brittle material. The slotted interface part, on the other hand, is always subjected to a certain notch effect, and therefore can only be produced from sufficiently elastic materials. In principle, however, if sufficiently elastic materials are used in the region of the tool head, it is also possible, within the scope of the invention, for the slotted interface part to be connected to the tool head and for the other interface part to be connected to the tool shank.

A preferred embodiment of the invention provides for a plurality of recesses to be provided around the circumference of the respective annular web. For adequate flexibility of the slotted interface part with, at the same time, sufficient stability, it has proved advantageous in this case, in particular, for the number of recesses to be between two and ten. In a preferred embodiment, approximately six recesses are provided, which are arranged, in particular, with an even distribution around the circumference of the respective annular web. The recess or each recess preferably constitutes a radial cut through the annular web. Additionally, or alternatively, the recess or each recess is preferably widened at its base or foot by a round bore, in order to prevent the notch effect caused by the recess.

Preferably, the cone surfaces of the interface parts that effect centering, i.e. the inner cone surface of the first interface part and the corresponding outer cone surface of the second interface part, are of substantially greater dimensions than the respectively outer cone surfaces of the two interface parts. In particular, the extent (depth) of the inner cone surface of the first interface part, measured in the direction of the shank axis, is at least 4 times, in particular at least 6 times, and preferably approximately 7 times the corresponding extent (depth) of the outer cone face of the first interface part adjoining on the outside. Owing to the complementary design, the same also applies to the cone surfaces of the second interface part.

In addition or as an alternative thereto, the inner cone surfaces of the interface parts, i.e. again the inner cone surface of the first interface part and the outer cone surface of the second interface part, are realized so as to be substantially steeper than the outer cone surfaces of the interface parts. For the "steepness" of the respective cone surfaces, the angle of inclination enclosed between the respective cone surface and the shank axis is considered in the following. In this case, respectively the lesser angle (less than 90°) between the cone surface and the shank axis is considered as the angle of inclination. For the purpose of comparability, the angle of inclination in this case—irrespective of whether the cone surface is realized as an inner or outer cone surface—is always considered on the basis of the absolute amount, i.e. always with a positive preceding sign. In a preferred dimensioning, in this case, the inner cone surface of the first interface part has an angle of inclination that is at least 2 times, in particular at least 4 times, and preferably approximately 6 times the angle of inclination of the surrounding outer cone surface. Owing to the complementary design, the same also applies to cone surfaces of the second interface part.

In an expedient embodiment, the interface is realized for screw connection of the tool head to the tool shank. For this purpose, the first interface part is preferably provided with a threaded bore that is coaxial with the shank axis, and the second interface part is provided with a threaded pin corresponding thereto. In an expedient embodiment of the invention, the threaded pin exists as a separate part, which is also screwed to the second interface part. Alternatively, however, the threaded pin can also be soldered, adhesive-bonded, pressed or otherwise connected to the second interface part. In the case of the first invention variant, in which the first interface part is slotted, the threaded pin, in a further embodiment, exists as an integral, i.e. single-piece, constituent part of the second interface part.

One of the interface parts or both interface parts can be joined to the respective tool part, i.e. to the tool head or to the tool shank, so as to constitute a single piece therewith. Alternatively, each of the interface parts can also be produced as a separate part and joined to the respective tool part. In particular, in a preferred embodiment of the design, the shank-side interface part is a separate part. In this case, the tool shank is a multipart tool shank and comprises, in addition to the shank-side interface part, a shank body connected thereto. This makes it possible, in particular, for the shank body and the shank-side interface part to be produced from differing materials.

In the case of the tool shank being produced as multiple parts, the shank-side interface part and the shank body are preferably materially connected to each other, in particular soldered or adhesive-bonded. In order, again, for the shank-side interface part to be connected to the shank body in a well centered and stable manner, these two parts are preferably provided with corresponding, conical bearing contact surfaces.

As already mentioned, the tool head is preferably composed of a sintered material that can be produced inexpensively, but which, on the other hand, is particularly suitable because of its material properties. The head-side interface part is also preferably produced—in particular, so as to constitute a single piece with the tool head—by sintering. The interface surfaces of this interface part in this case are preferably not reworked subsequently by milling, turning or the like.

The above object is furthermore achieved, according to the invention, by a tool head having the features of claim 13 and by a tool shank having the features of claim 14. The tool head or tool shank in this case, for the purpose of coupling to the respectively other tool part, is provided, respectively, with the first interface part or the second interface part of one of the embodiment variants of the tool interface according to the invention described above.

In addition, the object is achieved by a tool comprising a tool head, a tool shank and the tool interface described above.

DESCRIPTION OF THE FIGURES

Exemplary embodiments of the invention are described more fully in the following with reference to a drawing, wherein FIG. 1 shows a side view of a first exemplary embodiment of a tool comprising a tool head, a tool shank and a tool interface that connects these two tool parts to each other, FIG. 2 shows a longitudinal section of the tool according to FIG. 1, in an enlarged, portional representation, FIG. 3 shows a longitudinal section of a shank body of the tool shank, in an isolated representation, FIG. 4 shows a longitudinal section of a shank-side interface part of the tool shank, in an isolated representation, FIG. 5 shows an enlarged representation of the interface part in the detail V according to FIG. 4.

Figure 6:
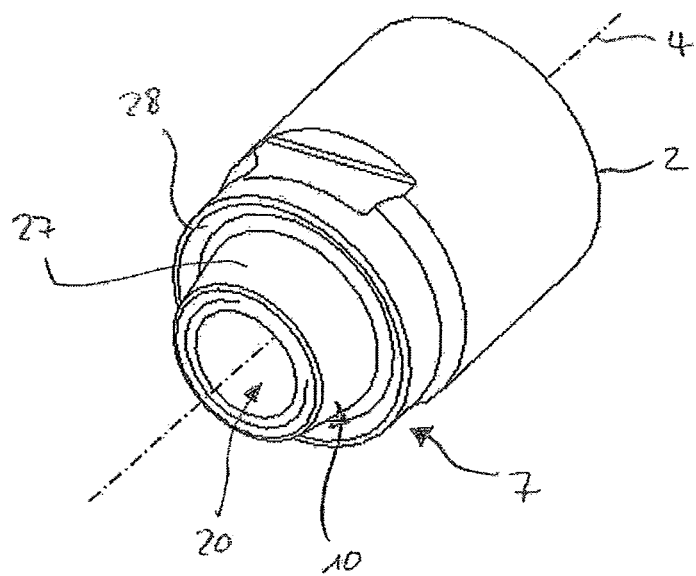
FIG. 6 shows a perspective, isolated representation of the tool head.

In all figures, parts and sizes that correspond to one another are in each case denoted by the same references.

DESCRIPTION OF THE EXEMPLARY EMBODIMENT

The tool 1 represented in the figures comprises a (tool) head 2 and a (tool) shank 3. These two tool parts are detachably connected to each other via a (tool) interface 5, being centered in respect of a shank axis 4.

In the exemplary embodiment, the head 2, represented merely schematically in the figures, is a tool head provided for machining a workpiece by removing stock through rotation, in particular a drill bit, milling cutter or reamer. The shank 3, accordingly, serves to couple the head 2 to a rotating spindle of a machine tool (not represented). To enable torques to be transmitted to the head 2, the interface part 5 is realized to fix the head 2 to the shank 3 in positionally and rotationally fixed manner, when the head has been mounted.

For this purpose, the interface 5 comprises two interface parts 6 and 7. In this case, the interface part 6 is assigned to the shank 3. This interface part 6 is produced as a separate part and only subsequently connected to a shank body 8 of the shank 3. The interface part 7, on the other hand, is assigned to the head 2. In the exemplary embodiment, this interface part 7 is realized as an integral, i.e. single-piece, constituent part of the head 2, and therefore constitutes the shank-side end of the head 2.

On the end faces that face towards each other, the two interface parts 6 and 7 are provided with interface surfaces 9 and 10, respectively, which are designed so as to complement each other substantially. The interface surface 10 assigned to the interface part 7 thus constitutes, at least approximately, the negative shape relative to the interface surface 9 assigned to the interface part 6, such that the interface surfaces 9 and 10 bear flatly on each other, at least portionally, when the interface parts 6 and 7 have been fitted together.

For the purpose of connection to the interface part 6, the shank body 8 has, on its outside face that faces towards the interface part 6, an outer cone 11, which serves as a bearing contact surface and which corresponds with an inner cone 12 of the interface part 6, which inner cone is of complementary shape and serves as a counter-bearing contact surface. The shank body 8 and the interface part 6 are placed flatly on each other through these bearing contact surfaces. For the purpose of permanent connection, the interface part 6 and the shank body 8 are hard-soldered along the said bearing contact surfaces.

At its end that faces away from the interface part 6, the shank body 8 has a clamping region 13, by means of which the shank 3 is clamped in a prescribed manner in a chuck of the spindle of the associated machine tool. In the case of small-dimension embodiments of the tool 1, the clamping region 13 is preferably realized—as represented in the figures—in the form of a cylinder. As an alternative thereto—in particular, in the case of large-dimension embodiments of the tool 1—the clamping region 13 can also be adapted to other standard, in particular conical, tool receivers, being realized, in particular, as a steep-angle taper, hollow-shank taper or Morse taper.

The interface part 6 and—preferably—also the shank body 8 are each provided with a bore 14 and 15, respectively, (FIG. 2), which are central and therefore aligned coaxially with the shank axis 4. The bore 15 assigned to the shank body 8 serves primarily to optionally guide a cooling and lubricating agent to the head 2. Moreover, the bore 14 assigned to the interface part 6 also serves for screw connection of the interface parts 6 and 7. For this purpose, the bore 14 is provided with an internal thread 16 (FIG. 2).

Figure 8:
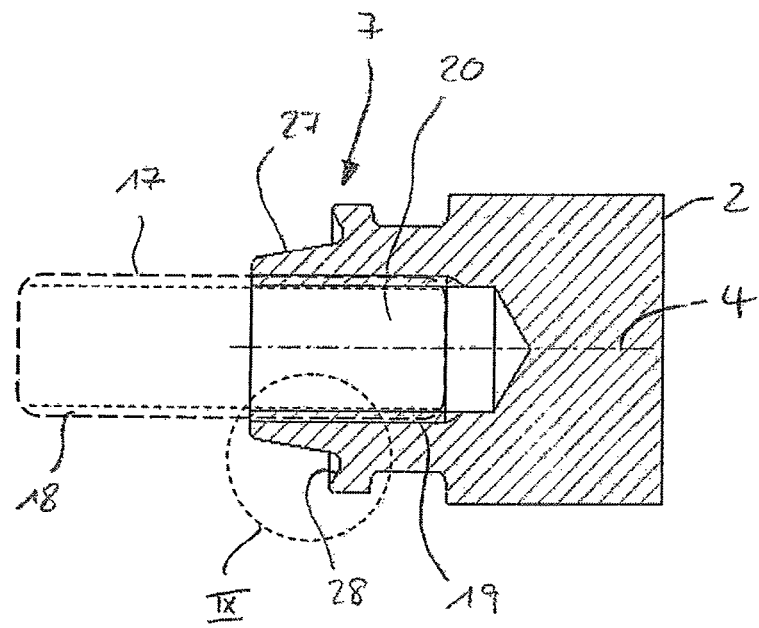
FIG. 8 shows, in an isolated representation, a longitudinal section of the tool head with an additionally indicated threaded pin for screwing the tool head to the tool shank.

The screw connection of the interface parts 6 and 7 is effected by means of a threaded pin 17—for reasons of simplicity, denoted merely by a broken line in FIG. 8—which carries an outer thread 18 (FIG. 8) that corresponds with the internal thread 16. In the exemplary embodiment represented, the threaded pin 17 can be screwed both to the interface part 6 and to the interface part 7. For this purpose, the interface part 7 is provided with a threaded bore 20 (FIG. 2), which carries a further internal thread 19 (FIG. 2) and which, when the two interface parts 6 and 7 have been mounted, is in alignment with the bore 14 of the interface part 6 and, in this state, is aligned coaxially with the shank axis 4. In an alternative embodiment of the tool 1, the threaded pin 17 can also be fixedly connected to the interface part 7, namely, either realized as an integral component part of this interface part 7 or soldered, adhesive-bonded or pressed onto the latter. In each case, the threaded pin 17 is preferably provided with a central bore (not represented in greater detail), to enable cooling and lubricating agent to be guided centrally to the head 2.

The shaping of the corresponding interface surfaces 9 and 10 is crucial to the ability of the tool 1 to function according to the invention. As can be seen from FIG. 5, in particular, the interface surface 9 of the shank-side interface part 6 is constituted substantially by an (inner) cone surface 21 and an (outer) cone surface 22 surrounding the latter on the outside. Both cone surfaces 21 and 22 are centered in respect of the shank axis 4, and therefore aligned coaxially with each other. An annular web 23 is therefore formed between the inner cone surface 21 and the outer cone surface 22. In respect of its axial depth t1, the inner cone surface 21 in this case is of substantially greater dimension than the outer cone surface 22, whose correspondingly measured depth is denoted by t2 in the following. The axial extent of the annular web 23 is therefore defined substantially by the depth t1 of the inner cone surface 21. In a preferred embodiment, the depths t1 and t2 of the cone surfaces 21 and 22, respectively, are selected so as to be in the ratio of t1:t2=7:1.

Furthermore, the inner cone surface 21 is realized so as to be substantially steeper than the surrounding outer cone surface 22. In the example represented, the angle of inclination $\alpha 1$ and $\alpha 2$ of the cone surfaces 21 and 22, respectively, to be measured according to the above definition, are selected so as to be in the ratio of approximately $\alpha 1:\alpha 2=1:6$. In particular, the angle of inclination $\alpha 1$ is approximately 10°, while the angle of inclination $\alpha 2$ is approximately 60°.

The annular web 23 formed between the cone surfaces 21 and 22 is interrupted by six recesses 24, arranged with an even distribution around the circumference of the annular web 23. Each of the recesses 24 goes fully through the annular web 23 in the radial direction, and thus extends over the entire radial width of the annular web 23, from the inner cone surface 21 to the outer cone surface 22, or to the outer circumference of the interface part 6. The annular web 23 is thus divided into six segments by the recesses 24. Starting from the head-side end face of the interface part 6, each of the recesses 24 is let into the annular web 23 in the axial direction, and extends substantially as far as the base of the receiver 25 delimited by the inner cone surface 21. At its foot or base, each of the recesses 24 is widened by a radial circular bore 26.

Figure 9:
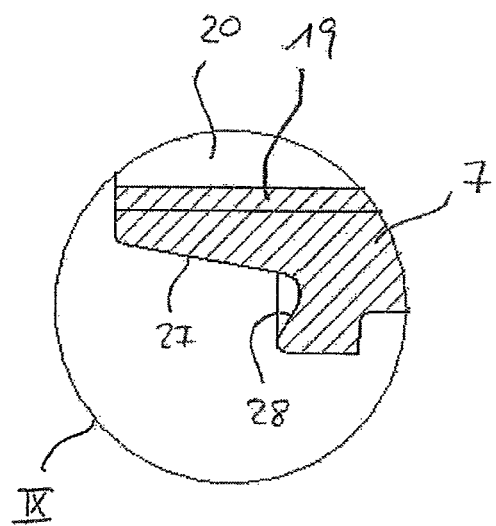
FIG. 9 shows, in an enlarged view of the detail IX according to FIG. 8, a head-side interface part connected to the tool head so as to constitute a single piece therewith.
Figure 10:
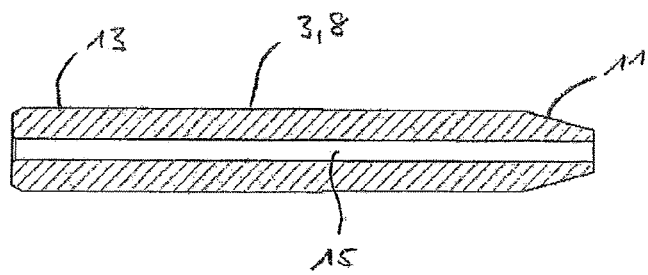
FIG. 10 shows, in a representation according to FIG. 3, the shank body of the tool shank of a second exemplary embodiment of the tool.
Figure 11:
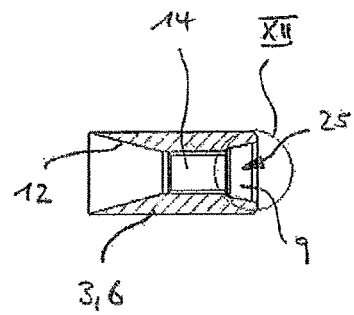
FIG. 11 shows, in a representation according to FIG. 4, the shank-side interface part of the tool according to FIG. 10.
Figure 12:
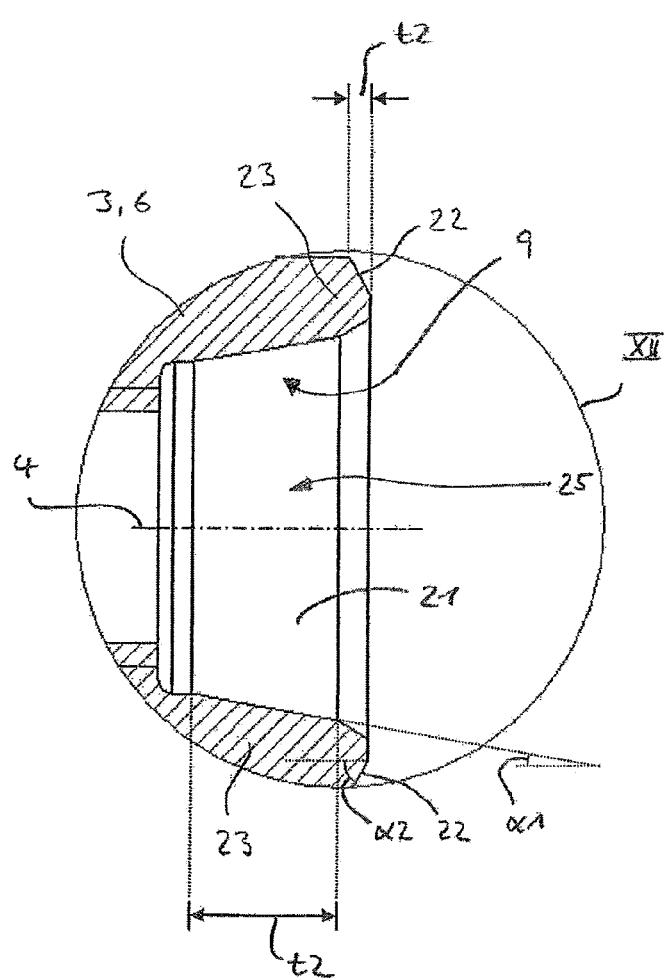
FIG. 12 shows an enlarged representation of the interface part in the detail XII according to FIG. 11.
Figure 13:
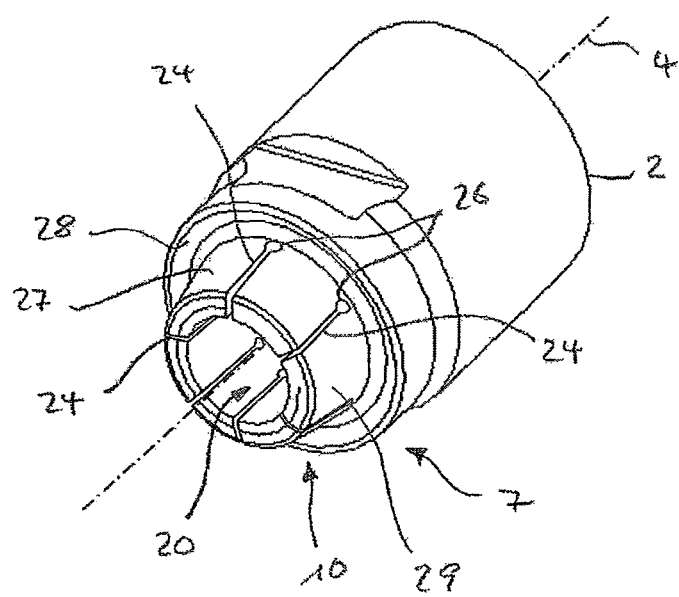
FIG. 13 shows, in a representation according to FIG. 6, the tool head of the tool according to FIG. 10.
Figure 14:
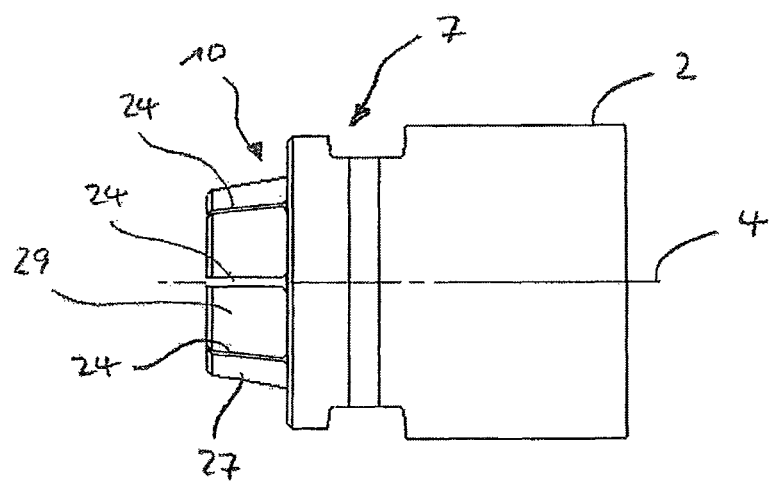
FIG. 14 shows, in a representation according to FIG. 7, the tool head of the tool according to FIG. 10.

The interface surface 10 of the head-side interface part 6, which is shaped so as to be substantially complementary to the interface surface 9, has—as can be seen, in particular, from FIGS. 8 and 9—an (outer) cone surface 27 and an (inner) cone surface 28 surrounding the latter, these cone surfaces 27 and 28 being centered in respect of the shank axis 4 (here, more precisely: the axis of the head 2). As part of the interface 5, the outer cone surface 27 corresponds, as a counter-bearing contact surface, with the inner cone surface 21 of the interface part 6. The inner cone surface 28 of the interface part 7, on the other hand, corresponds with the outer cone surface 22 of the interface part 6. The cone surfaces 27 and 28, accordingly, have at least approximately the same depth and the same angle of inclination as the respectively corresponding cone surface 21 and 22, respectively, of the interface part 6.

Figure 7:
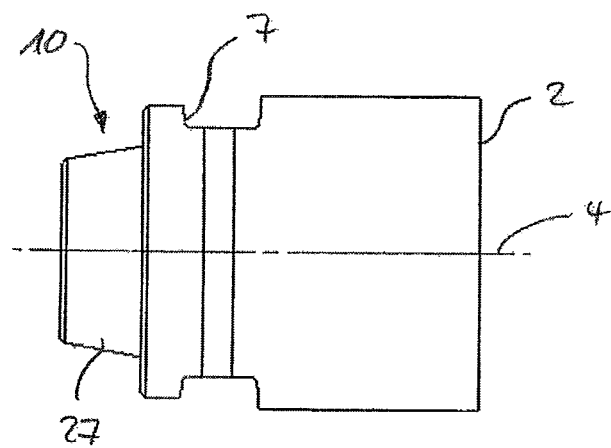
FIG. 7 shows an isolated side view of the tool head.

As can be seen from FIGS. 6 to 8, the cone surfaces 27 and 28 are not interrupted on their circumference. The interface part 7 thus has no correspondence to the recesses 24 of the interface part 6.

When the interface parts 6 and 7 have been mounted (see FIG. 2), the interface surfaces 9 and 10 bear flatly on each other in the region of the corresponding cone surfaces 21 and 27 and in the region of the cone surfaces 22 and 28, which likewise correspond with each other. On the other hand, preferably, the interface surfaces 9 and 10 are not in contact with each other in the annular intermediate regions between the cone surfaces 21 and 22 and the cone surfaces 27 and 28. In this region, therefore, the interface surfaces 9 and 10 can also have variations from the basically complementary form. In particular, it can be seen from comparison of FIGS. 5 and 9 that the intermediate region between the cone surfaces 27 and 28 is rounded, while the intermediate region between the cone surfaces 21 and 22 is constituted by a conical annular surface and a planar annular surface, which merge, via pronounced edges, into each other and into the adjoining cone surfaces 21 and 22.

For the purpose of mounting the head 2 on the shank 3, the interface parts 6 and 7 are screwed to each other by means of the threaded pin 17. In this case, the cone surfaces 21 and 27, which primarily serve the function of centering, first come to bear on one another. As the interface parts 6 and 7 continue to be screwed, the individual segments of the annular web 23 are displaced radially outwards by force deflection at the cone surfaces 21, 27. In this way, the hollow taper constituted by the inner cone surface 21 adapts to the outer cone surface 27, until a complete, flat bearing contact of the two cone surfaces 21 and 27 has been achieved. Owing to the deformability of the annular web 23, production tolerances that result in slightly differing angles of inclination of the cone surfaces 21 and 27 can be compensated.

As the interface parts 6 and 7 continue to be screwed, the outer cone surfaces 22 and 28 also come into bearing contact, as a result of which the individual segments of the annular web 23 are acted upon in the radially inward direction. The annular web 23 is thus clamped between the oppositely oriented cone surfaces 27 and 28 of the interface part 6, as a result of which the interface 5 becomes stabilized.

In order to ensure adequate elasticity of the annular web 23, the interface part 6 is preferably made from steel. The shank body 8 can likewise be made from steel. In particular, the shank body 8 and the interface part 6—in departure from the embodiment represented—can also be produced in this case so as to constitute a single piece with one another. If the shank 3 is produced in multiple parts, on the other hand, the shank body 8 is preferably composed of a different material than the interface part 6, in particular of hard or heavy metal.

The head 2, including the interface part 6 integrally connected thereto, is preferably composed of a sintered material, in particular a sintered metal. A substantial advantage of the described interface 5 then consists in that, owing to the slotted and therefore particularly flexible interface part 6, the interface surface 10 of the interface part 7 need not be reworked by turning, milling or grinding. Accordingly, the interface surface 10 preferably exists in the state in which it conies out of the sintering process. In departure therefrom, however, the head 2 and the interface part 7 can also be produced from steel or hard metal.

A second exemplary embodiment of the tool 1 is represented in FIGS. 10 to 14. This tool 1 is similar—apart from the differences explained in the following—to the exemplary embodiment described above. Differing from the latter, in the case of the tool 1 according to FIGS. 10 to 14 it is not the interface part 6, but the interface part 7, which is slotted. Here, the recesses 24 interrupt an annular web 29, which is delimited radially on the outside by the outer cone surface 27, and delimited radially on the inside by the wall of the threaded bore 20. Here, the cone surfaces 21 and 22 of the interface part 6, like the cone surface 28 of the interface part 7, are not interrupted. In order that the flexibility of the segments of the slotted annular web 29 is not limited excessively by the threaded pin 17 inserted in the threaded bore 20 when the interface 5 has been mounted, the threaded bore 20 is slightly over-dimensioned in the region of the annular web 29, relative to the diameter of the threaded pin 17, such that an adequate clearance is formed between the threaded pin 17 and the annular web 29. Optionally, the threaded bore 20 has no threading in this region.

The individual design features of the two embodiments described above can be combined with each other in any way.

What is claimed is:

1. A tool interface (5) for coupling a tool head (2) to a tool shank (3) in a centered manner in respect of a shank axis (4), comprising:
   a first interface part (6) that is configured to be connected to the tool shank (3) or to the tool head (2); and
   a second interface part (7) that is configured to be connected to the respective other tool part, namely, to the tool head (2) or to the tool shank (3), the two interface parts (6, 7) having interface surfaces (9, 10) that substantially complement each other and are intended to bear flatly on each other, the interface surface (9) of the first interface part (6) comprising an inner cone surface (21) and an outer cone surface (22), which surrounds the latter on the outside and coaxially, and the interface surface (9) of the second interface part (7) comprising an outer cone surface (27), which corresponds with the inner cone surface (21) of the first interface part (6), and an inner cone surface (28), which corresponds with the outer cone surface (22) of the first interface part (6), wherein an annular web (23) formed between the inner cone surface (21) and the outer cone surface (22) of the first interface part (6) is slotted by at least one recess (24), wherein the inner cone surface (21) of the first interface part (6) has an extent, in the direction of the shank axis (4), that exceeds the corresponding extent of the outer cone surface (22) of the first interface part (6) by at least a factor 4, and wherein, when the first interface part (6) is joined to the second interface part (7), the annular web (23) of the first interface part (6) is acted upon in a radially inward direction by the second interface part (7) thereby locking the annular web (23) of the first interface part (6) between the inner cone surface (28) and the outer cone surface (27) of the second interface part (6).

2. A tool interface (5) for coupling a tool head (2) to a tool shank (3) in a centered manner in respect of a shank axis (4), comprising:
   a first interface part (6) that is configured to be connected to the tool shank (3) or to the tool head (2); and
   a second interface part (7) that is configured to be connected to the respective other tool part, namely, to the tool head (2) or to the tool shank (3), the two interface parts (6, 7) having interface surfaces (9, 10) that substantially complement each other and are intended to bear flatly on each other, the interface surface (9) of the first interface part (6) comprising an inner cone surface (21) and an outer cone surface (22), which surrounds the latter on the outside and coaxially, and the interface surface (9) of the second interface part (7) comprising an outer cone surface (27), which corresponds with the inner cone surface (21) of the first interface part (6), and an inner cone surface (28), which corresponds with the outer cone surface (22) of the first interface part (6), wherein the second interface part (7) has a central bore (20) surrounded coaxially by its outer cone surface (27), and an annular web (29) formed between the outer cone surface (27) and the bore (20) is slotted by at least one recess (24).

3. The tool interface (5) as claimed in claim 1 or 2, wherein the slotted interface part (6; 7) is connected to the tool shank (3), and the respectively other interface part (7; 6) is connected to the tool head (2).

4. The tool interface (5) as claimed in claim 1 or 2, wherein at least two recesses (24) are provided in a distributed manner around the circumference of the respective annular web (23, 29).

5. The tool interface (5) as claimed in claim 2, wherein the inner cone surface (21) of the first interface part (6) has an extent, in the direction of the shank axis (4), that exceeds the corresponding extent of the outer cone surface (22) of the first interface part (6) by at least a factor 4.

6. The tool interface (5) as claimed in claim 1 or 2, wherein the inner cone surface (21) of the first interface part (6) has, relative to the shank axis (4), an angle of inclination ($\alpha1$) that is more acute than the corresponding angle of inclination ($\alpha2$) of the outer cone surface (22) of the first interface part (6) by at least a factor 2.

7. The tool interface (5) as claimed in claim 1 or 2, wherein the first interface part (6) is provided with a threaded bore (14) that is coaxial with the shank axis (4), and the second interface part (7) is provided with a threaded pin (17) that corresponds with the threaded bore (14) for the purpose of screwing the interface parts (6, 7).

8. The tool interface (5) as claimed in claim 7, wherein the threaded pin (17) is screwed to the second interface part (7).

9. The tool interface (5) as claimed in claim 1 or 2, wherein the tool shank (3) is produced in multiple parts from a shank body (8) and the shank-side interface part (6).

10. The tool interface (5) as claimed in claim 9, wherein the shank-side interface part (6) is materially connected to the shank body (8).

11. The tool interface (5) as claimed in claim 9, wherein the shank-side interface part (6) and the shank body (8) are connected to each other via corresponding, conical bearing-contact surfaces (11, 12).

12. A tool interface (5) for coupling a tool head (2) to a tool shank (3) in a centered manner in respect of a shank axis (4), comprising:
    a first interface part (6) that is configured to be connected to the tool shank (3) or to the tool head (2); and
    a second interface part (7) that is configured to be connected to the respective other tool part, namely, to the tool head (2) or to the tool shank (3), the two interface parts (6, 7) having interface surfaces (9, 10) that substantially complement each other and are intended to bear flatly on each other, the interface surface (9) of the first interface part (6) comprising an inner cone surface (21) and an outer cone surface (22), which surrounds the latter on the outside and coaxially, and the interface surface (9) of the second interface part (7) comprising an outer cone surface (27), which corresponds with the inner cone surface (21) of the first interface part (6), and an inner cone surface (28), which corresponds with the outer cone surface (22) of the first interface part (6), wherein an annular web (23) formed between the inner cone surface (21) and the outer cone surface (22) of the first interface part (6) is slotted by at least one recess (24), and wherein the inner cone surface (21) of the first interface part (6) has an extent, in the direction of the shank axis (4), that exceeds the corresponding extent of the outer cone surface (22) of the first interface part (6) by at least a factor 4, wherein the head-side interface part (7) is produced by sintering, without subsequent fine-working of its interface surface (10).

13. A tool head (2), which, for the purpose of coupling to a tool shank (3) in a centered manner in respect of a shank axis (4), is provided with a first or a second interface part (6, 7) according to claim 1 or 2.

14. A tool shank (3), which, for the purpose of coupling to a tool head (2) in a centered manner in respect of a shank axis (4), is provided with a first or a second interface part (6, 7) according to claim 1 or 2.

15. A tool (1), comprising a tool head (2), a tool shank (3) and a tool interface (5) according to claim 1 or 2.

16. The tool interface (5) as claimed in claim 1, wherein the inner cone surface (21) of the first interface part (6) has an extent, in the direction of the shank axis (4), that exceeds the corresponding extent of the outer cone surface (22) of the first interface part (6) by at least a factor 6.

17. The tool interface as claimed in claim 5, the inner cone surface (21) of the first interface part (6) has an extent, in the direction of the shank axis (4), that exceeds the corresponding extent of the outer cone surface (22) of the first interface part (6) by at least a factor 6.

18. A tool interface (5) for coupling a tool head (2) to a tool shank (3) in a centered manner in respect of a shank axis (4), comprising:

a first interface part (6) that is configured to be connected to the tool shank (3) or to the tool head (2); and a second interface part (7) that is configured to be connected to the respective other tool part, namely, to the tool head (2) or to the tool shank (3), the two interface parts (6, 7) having interface surfaces (9, 10) that substantially complement each other and are intended to bear flatly on each other, the interface surface (9) of the first interface part (6) comprising an inner cone surface (21) and an outer cone surface (22), which surrounds the latter on the outside and coaxially, and the interface surface (9) of the second interface part (7) comprising an outer cone surface (27), which corresponds with the inner cone surface (21) of the first interface part (6), and an inner cone surface (28), which corresponds with the outer cone surface (22) of the first interface part (6), wherein the second interface part (7) has a central bore (20) surrounded coaxially by its outer cone surface (27), and an annular web (29) formed between the outer cone surface (27) and the bore (20) is slotted by at least one recess (24), wherein the head-side interface part (7) is produced by sintering, without subsequent fine-working of its interface surface (10).

\* \* \* \* \*